US012265660B2

(12) United States Patent
Chen

(10) Patent No.: US 12,265,660 B2
(45) Date of Patent: Apr. 1, 2025

(54) HAPTIC FEEDBACK METHOD, DRIVER CIRCUIT OF HAPTIC FEEDBACK FILM LAYER, AND HAPTIC FEEDBACK APPARATUS

(71) Applicants: Beijing BOE Technology Development Co., Ltd., Beijing (CN); BOE Technology Group Co., Ltd., Beijing (CN)

(72) Inventor: Yuju Chen, Beijing (CN)

(73) Assignees: Beijing BOE Technology Development Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/029,343

(22) PCT Filed: Jun. 16, 2022

(86) PCT No.: PCT/CN2022/099195
§ 371 (c)(1),
(2) Date: Mar. 29, 2023

(87) PCT Pub. No.: WO2023/240545
PCT Pub. Date: Dec. 21, 2023

(65) Prior Publication Data
US 2024/0361839 A1    Oct. 31, 2024

(51) Int. Cl.
*G06F 3/01*        (2006.01)
*G06F 3/041*       (2006.01)
*G06F 3/0488*      (2022.01)

(52) U.S. Cl.
CPC ............ *G06F 3/016* (2013.01); *G06F 3/0412* (2013.01); *G06F 3/0488* (2013.01)

(58) Field of Classification Search
CPC ....... G06F 3/016; G06F 3/0412–04886; G06F 3/01; G06F 3/041; G06F 3/044
See application file for complete search history.

(56) References Cited

U.S. PATENT DOCUMENTS

| 8,593,269 B2 | 11/2013 | Grant et al. |
| 8,619,051 B2 | 12/2013 | Lacroix et al. |
| 10,591,994 B2 | 3/2020 | Levesque et al. |
| 2015/0153830 A1* | 6/2015 | Hirose .................... G06F 3/016 345/173 |

(Continued)

FOREIGN PATENT DOCUMENTS

| CN | 110917613 A | 3/2020 |
| CN | 113641261 A | 11/2021 |

(Continued)

*Primary Examiner* — Temesghen Ghebretinsae
*Assistant Examiner* — Ivelisse Martinez Quiles
(74) *Attorney, Agent, or Firm* — IPro, PLLC

(57) ABSTRACT

Disclosed are a haptic feedback method, a driver circuit of a haptic feedback film layer, and a haptic feedback apparatus. The haptic feedback method includes determining a touch position corresponding to a touch operation received by the haptic feedback film layer; determining a target driving signal corresponding to the touch position, wherein the target driving signal includes a plurality of sub-signals with different signal parameters; and driving the haptic feedback film layer to vibrate through the target driving signal.

14 Claims, 7 Drawing Sheets

(56) References Cited

U.S. PATENT DOCUMENTS

| | | | |
|---|---|---|---|
| 2016/0342213 A1 | 11/2016 | Endo et al. | |
| 2017/0178470 A1* | 6/2017 | Khoshkava | G06F 3/0412 |
| 2020/0356173 A1* | 11/2020 | Bajaj | G08B 6/00 |
| 2021/0294417 A1 | 9/2021 | Chu Ke | |

FOREIGN PATENT DOCUMENTS

| | | | |
|---|---|---|---|
| CN | 113778229 A | * | 12/2021 |
| CN | 114237399 A | | 3/2022 |
| JP | 2008130055 A | | 6/2008 |
| WO | 2015121971 A1 | | 8/2015 |

* cited by examiner

HAPTIC FEEDBACK METHOD, DRIVER CIRCUIT OF HAPTIC FEEDBACK FILM LAYER, AND HAPTIC FEEDBACK APPARATUS

CROSS-REFERENCE TO RELATED APPLICATIONS

This application is a U.S. national stage of international application No. PCT/CN2022/099195, filed on Jun. 16, 2022, the disclosure of which is herein incorporated by reference in its entirety.

TECHNICAL FIELD

The present disclosure relates to the technical field of haptic feedback, and in particular to a haptic feedback method, a driver circuit of a haptic feedback film layer, and a haptic feedback apparatus.

BACKGROUND OF THE INVENTION

Haptic feedback is a technology that simulates a real haptic experience through vibration. A haptic feedback apparatus typically adopts the haptic feedback technology to improve the user's touch experience.

SUMMARY OF THE INVENTION

The present disclosure provides a haptic feedback method, a driver circuit of a haptic feedback film layer, and a haptic feedback apparatus. The technical solutions are as follows.

According to some embodiments of the present disclosure, a haptic feedback method applicable to a driver circuit in a haptic feedback apparatus is provided, wherein the haptic feedback apparatus further includes a haptic feedback film layer. The method includes:
  determining a touch position corresponding to a touch operation received by the haptic feedback film layer;
  determining a target driving signal corresponding to the touch position, wherein the target driving signal includes a plurality of sub-signals with different signal parameters; and driving the haptic feedback film layer to vibrate through the target driving signal.

In some embodiments, the haptic feedback film layer is provided with a plurality of areas, and the driver circuit stores a first corresponding relationship thereon in which a driving signal corresponding to each of the plurality of areas is recorded; and determining the target driving signal corresponding to the touch position includes:
  determining a target area where the touch position is located from the plurality of areas; and
  determining the target driving signal corresponding to the target area according to the first corresponding relationship.

In some embodiments, the driving signal corresponding to each area in the first corresponding relationship is acquired by performing mode decomposition on a desired vibration mode of the area.

In some embodiments, the haptic feedback apparatus is a display apparatus, the driver circuit stores a second corresponding relationship thereon in which a driving signal corresponding to each of a plurality of controls is recorded, and determining the target driving signal corresponding to the touch position includes:
  determining a target control displayed at the touch position, wherein the target control belongs to the plurality of controls; and
  determining a target driving signal corresponding to the target control according to the second corresponding relationship.

In some embodiments, the driving signal corresponding to each control in the second corresponding relationship is acquired by performing mode decomposition on a desired vibration mode of the control.

In some embodiments, determining the target driving signal corresponding to the touch position includes:
  in a case that a pressure value of a target object touching the haptic feedback film layer is determined to be greater than a pressure threshold, determining the target driving signal corresponding to the touch position.

In some embodiments, the haptic feedback film layer includes a plurality of actuators located at different areas, and the driver circuit includes: a control circuit and a waveform generation circuit; and driving the haptic feedback film layer to vibrate through the target driving signal includes:
  controlling, by the control circuit, the waveform generation circuit to output the plurality of sub-signals to each of the plurality of actuators.

In some embodiments, controlling, by the control circuit, the waveform generation circuit to output the plurality of sub-signals to each of the plurality of actuators includes:
  sending, by the control circuit, driving information to the waveform generation circuit, wherein the driving information includes signal parameters of the plurality of sub-signals, driving sequences of the plurality of sub-signals, and driving duration of each sub-signal; and
  sequentially outputting, by the waveform generation circuit, the plurality of sub-signals to each actuator according to the driving information.

In some embodiments, controlling, by the control circuit, the waveform generation circuit to output the plurality of sub-signals to each of the plurality of actuators includes:
  sending, by the control circuit, driving information to the waveform generation circuit, wherein the driving information includes signal parameters of the plurality of sub-signals; and
  simultaneously outputting, by the waveform generation circuit, the plurality of sub-signals to each actuator according to the driving information.

In some embodiments, the signal parameter of each of the plurality of sub-signals includes a frequency of the sub-signal.

According to some embodiments of the present disclosure, a driver circuit of a haptic feedback film layer applicable to a haptic feedback apparatus is provided, and the driver circuit includes a control circuit and a waveform generation circuit, wherein the waveform generation circuit is connected with the haptic feedback film layer;
  the control circuit is configured to determine a touch position corresponding to a touch operation received by the haptic feedback film layer, and determine a target driving signal corresponding to the touch position, wherein the target driving signal includes a plurality of sub-signals with different signal parameters; and
  the waveform generation circuit is configured to output the target driving signal so as to drive the haptic feedback film layer to vibrate.

In some embodiments, the haptic feedback film layer is provided with a plurality of areas, the control circuit stores a first corresponding relationship thereon in which a driving signal corresponding to each of the plurality of areas is recorded, and the control circuit is configured to:
    determine a target area where the touch position is located from the plurality of areas; and
    determine the target driving signal corresponding to the target area according to the first corresponding relationship.

In some embodiments, the haptic feedback apparatus is a display apparatus, the control circuit stores a second corresponding relationship thereon in which a driving signal corresponding to each of the plurality of controls is recorded, and the control circuit is configured to:
    determine a target control displayed at the touch position, wherein the target control belongs to the plurality of controls; and
    determine a target driving signal corresponding to the target control according to the second corresponding relationship.

In some embodiments, the control circuit is configured to determine a target driving signal corresponding to the touch position in a case that a pressure value of a target object touching the haptic feedback film layer is determined to be greater than a pressure threshold.

In some embodiments, the haptic feedback film layer includes a plurality of actuators located at different areas, and the control circuit is configured to control the waveform generation circuit to output the plurality of sub-signals to each of the plurality of actuators.

In some embodiments, the control circuit is configured to send driving information to the waveform generation circuit, wherein the driving information includes signal parameters of the plurality of sub-signals, driving sequences of the plurality of sub-signals, and driving duration of each sub-signal; and
    the waveform generation circuit is configured to sequentially output the plurality of sub-signals to each actuator according to the driving information.

In some embodiments, the control circuit is configured to send driving information to the waveform generation circuit, wherein the driving information includes signal parameters of the plurality of sub-signals; and
    the waveform generation circuit is configured to output the plurality of sub-signals to each actuator simultaneously according to the driving information.

According to some embodiments of the present disclosure, a haptic feedback apparatus is provided, wherein the haptic feedback apparatus includes a haptic feedback film layer, and the driver circuit according to any one of the above embodiments.

According to some embodiments of the present disclosure, a control circuit including a processor and a memory storing instructions thereon is provided. The instructions, when loaded and executed by the processor, cause the processor to perform the haptic feedback method according to any one of the above embodiments.

According to some embodiments of the present disclosure, a non-transitory computer-readable storage medium storing instructions thereon is provided. The instructions, when loaded and executed by a processor of an electronic device, cause the electronic device to perform the haptic feedback method according to any one of the above embodiments.

BRIEF DESCRIPTION OF THE DRAWINGS

For clearer descriptions of the technical solutions according to the embodiments of the present disclosure, the drawings required to be used in the description of the embodiments are briefly introduced below. It is obvious that the drawings in the description below are only some embodiments of the present disclosure, and it is obvious for those skilled in the art that other drawings can be obtained according to the drawings without creative efforts.

DETAILED DESCRIPTION

For clearer descriptions of the objects, technical solutions, and advantages of the present disclosure, the embodiments of the present disclosure are further described in detail below with reference to the drawings.

In some practices, a haptic feedback apparatus generally includes a haptic feedback film layer and a driver circuit thereof. When the user's finger touches the haptic feedback film layer, the driver circuit controls the haptic feedback film layer to vibrate, thereby achieving haptic simulation and feedback.

Figure 1:
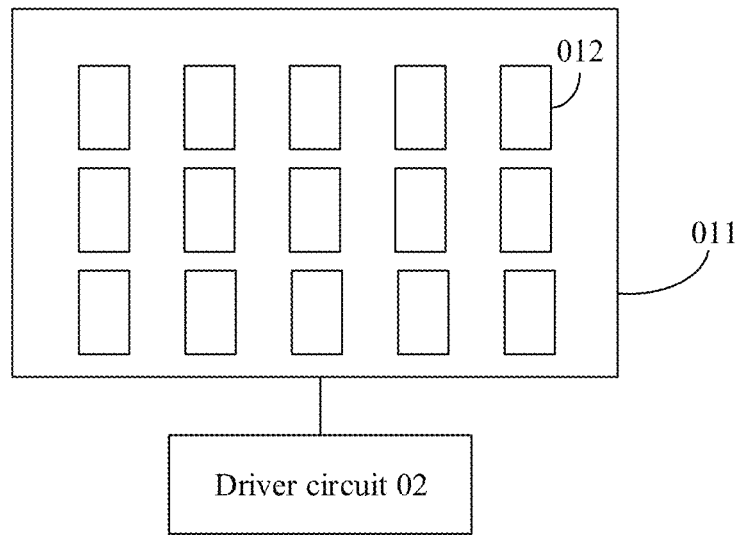
FIG. 1 is a schematic structural diagram of a haptic feedback apparatus according to some embodiments of the present disclosure.

FIG. 1 is a schematic structural diagram of a haptic feedback apparatus according to some embodiments of the present disclosure. The haptic feedback apparatus may be a mobile phone, a notebook computer, a tablet computer, a smart home, a vehicle-mounted terminal or a wearable apparatus, and the like which perform human-computer interaction through touch.

Referring to FIG. 1, the haptic feedback apparatus includes a haptic feedback film layer 01 and a driver circuit 02. The haptic feedback film layer 01 includes a thin film 011 and a plurality of piezoelectric sheets 012 located at different areas of the thin film 011.

In the embodiments of the present disclosure, the plurality of piezoelectric sheets 012 drive the thin film 011 to vibrate under the driving of the driver circuit 02. That is, the plurality of piezoelectric sheets 012 function as actuators of the thin film 011. In addition, the piezoelectric sheets 012 further function as sensors to detect touch operations. The thin film 011 may be a transparent thin film, and also may be a glass substrate, a touch panel, a display screen, and the like. The piezoelectric sheet 012 is a thin film piezoelectric material.

In the case that the haptic feedback apparatus is a display apparatus, the haptic feedback apparatus further includes a display panel. The haptic feedback film layer 01 is disposed on the display side of the display panel.

Figure 2:
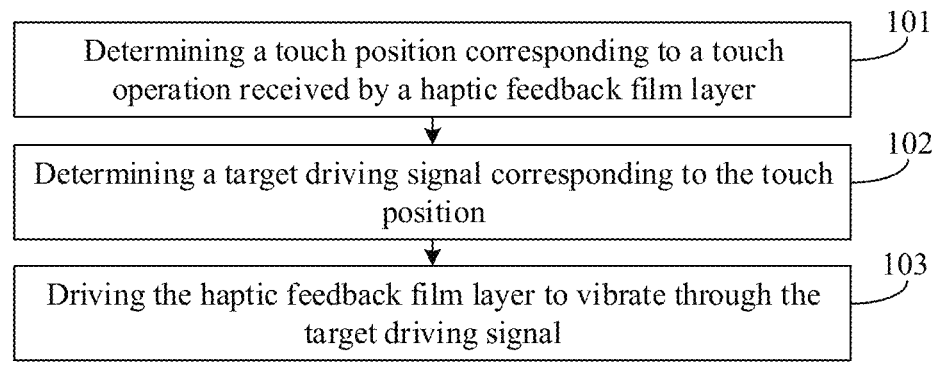
FIG. 2 is a schematic flowchart of a haptic feedback method according to some embodiments of the present disclosure.

FIG. 2 is a schematic flowchart of a haptic feedback method according to some embodiments of the present disclosure, wherein the method is applicable to a driver circuit in a haptic feedback apparatus, for example, the driver circuit in the haptic feedback apparatus shown in FIG. 1. The haptic feedback apparatus further includes a haptic feedback film layer. Referring to FIG. 2, the method includes the following steps.

In step 101, a touch position corresponding to a touch operation received by the haptic feedback film layer is determined.

In the embodiments of the present disclosure, the haptic feedback film layer includes a touch circuit, wherein the touch circuit can detect whether the haptic feedback film layer is touched. In the case that the touch circuit determines that a target object (e.g., the user's finger) touches the haptic feedback film layer, the touch circuit outputs a touch signal to the driver circuit. The driver circuit further determines a touch position corresponding to the touch operation based on the touch signal.

In some embodiments, the touch circuit includes a plurality of piezoelectric sheets, wherein the plurality of piezoelectric sheets are uniformly arranged on the haptic feedback film layer. In the case that a target object touches a certain position of the haptic feedback film layer, the piezoelectric sheets arranged at the position further detect the touch operation, and output a touch signal to the driver circuit. The driver circuit further determines a touch position of a touch operation based on the position of the piezoelectric sheet transmitting the touch signal on the haptic feedback film layer.

In step 102, a target driving signal corresponding to the touch position is determined.

In the embodiments of the present disclosure, after determining the touch position, the driver circuit can determine the target driving signal corresponding to the touch position based on a pre-stored corresponding relationship. The target driving signal includes a plurality of sub-signals with different signal parameters. The target driving signal corresponding to each touch position is determined based on the haptic sensation to be fed back to a target object at the touch position, and the target driving signals corresponding to different touch positions are different.

In some embodiments, the signal parameter of each sub-signal includes a frequency of the sub-signal. That is, the target driving signal includes a plurality of sub-signals with different frequencies. Or, the signal parameter of each sub-signal includes a frequency and an amplitude of the sub-signal.

It may be understood that the corresponding relationship is stored in a driver circuit before a haptic feedback apparatus leaves the factory. The corresponding relationship is determined based on the structure, dimensions, and/or material of the haptic feedback film layer.

In step 103, the haptic feedback film layer is driven to vibrate through the target driving signal.

In the embodiments of the present disclosure, in the case that the haptic feedback film layer vibrates under the driving of the target driving signal, the haptic simulation is achieved, such that the target object feels the haptic sensation fed back by the haptic feedback apparatus.

It may be understood that the haptic feedback film layer generates different vibration effects when driven by signals with different frequencies. The vibration effect is a vibration amplitude, a friction texture, a shape, softness, roughness, and the like which are felt by a target object in the case that the haptic sensation is fed back to the target object through vibration. Since the target driving signal includes a plurality of sub-signals with different signal parameters, a rich vibration effect is achieved in the haptic feedback film layer in the case that the target driving signal drives the haptic feedback film layer to vibrate.

In summary, some embodiments of the present disclosure provide a haptic feedback method. After determining the touch position corresponding to the touch operation, the driver circuit determines a target driving signal corresponding to the touch position, and drives the haptic feedback film layer to vibrate through the target driving signal. Since the target driving signal includes a plurality of sub-signals with different signal parameters, rich vibration effects are achieved in the haptic feedback film layer; and since the target driving signal is determined based on the touch position, the haptic feedback film layer provides different vibration effects for different touch positions, thereby effectively improving the flexibility of haptic feedback.

Figure 3:
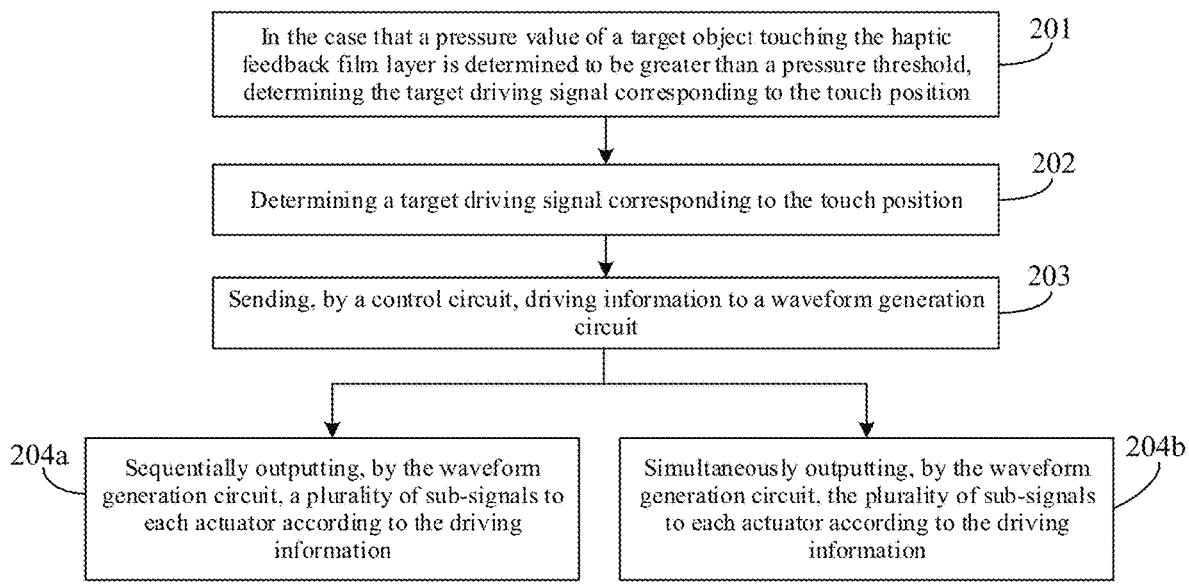
FIG. 3 is a schematic flowchart of another haptic feedback method according to some embodiments of the present disclosure.

FIG. 3 is a schematic flowchart of another haptic feedback method according to some embodiments of the present disclosure. The method is applicable to a driver circuit in a haptic feedback apparatus, for example, the driver circuit in the haptic feedback apparatus shown in FIG. 1. The haptic feedback apparatus further includes a haptic feedback film layer. Referring to FIG. 3, the method includes the following steps.

In step 201, in the case that a pressure value of a target object touching the haptic feedback film layer is determined to be greater than a pressure threshold, a target driving signal corresponding to the touch position is determined.

In the embodiments of the present disclosure, the haptic feedback film layer includes a touch circuit, wherein the touch circuit detects whether the haptic feedback film layer is touched. In the case that the touch circuit determines that a target object (e.g., the user's finger) touches the haptic feedback film layer, the touch circuit outputs a touch signal to the driver circuit. In addition, the touch circuit further detects a pressure value applied to the haptic feedback film layer when the target object touches the haptic feedback film layer. In the case that the driver circuit determines that the pressure value is greater than the preset pressure threshold, the driver circuit determines a target driving signal corresponding to the touch position based on the touch signal. In the case that the driver circuit determines that the pressure value is less than or equal to the pressure threshold, the operation of determining the target driving signal is not required to be performed.

The pressure threshold is determined based on a minimum pressure value applied to the haptic feedback film layer in the case that the target object normally touches the haptic feedback film layer. In the case that the target object touches the haptic feedback film layer by mistake, the pressure value applied to the haptic feedback film layer is smaller and the duration is shorter. The pressure value detected by the touch circuit is close to zero. Therefore, after determining that the pressure value is greater than the pressure threshold, the driver circuit determines the target driving signal based on the touch signal and performs the haptic feedback, thereby avoiding feedback caused by touching by mistake.

Therefore, after determining that the pressure value is greater than the pressure threshold, the driver circuit determines the target driving signal based on the touch signal and performs the haptic feedback, thereby avoiding feedback caused by touching by mistake.

In some embodiments, the haptic feedback film layer includes a plurality of piezoelectric sheets, wherein the plurality of piezoelectric sheets are uniformly arranged on the haptic feedback film layer. In the case that the target object touches a certain position of the haptic feedback film layer, the piezoelectric sheets arranged at the position detect the touch operation, and output a touch signal to the driver circuit. After receiving the touch signal, the driver circuit determines a touch position of the touch operation based on a position of the piezoelectric sheet on the haptic feedback film layer. The touch signal includes a pressure value of the touch operation.

Figure 4:
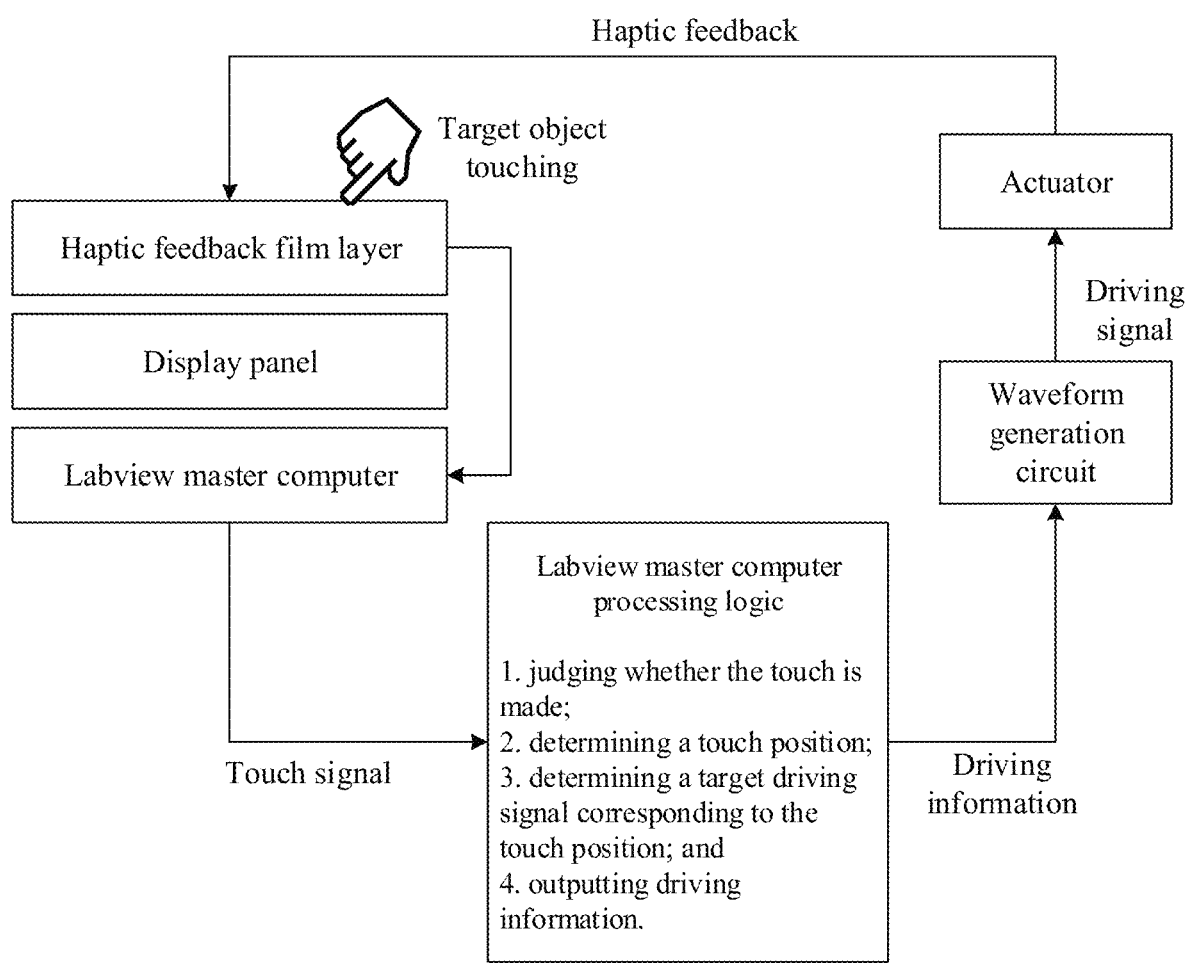
FIG. 4 is a schematic diagram of haptic feedback of a haptic feedback apparatus according to some embodiments of the present disclosure.

FIG. 4 is a schematic diagram of haptic feedback of a haptic feedback apparatus according to some embodiments of the present disclosure. The haptic feedback apparatus is a display apparatus. Referring to FIG. 4, the display apparatus further includes a display panel configured to display images. The driver circuit in the display apparatus includes a control circuit and a waveform generation circuit. The control circuit is a laboratory virtual instrument engineering workbench (Labview) master computer or a field-programmable gate array (FPGA). For example, referring to FIG. 4, the control circuit is a Labview master computer.

In some embodiments, in the display apparatus, the haptic feedback film layer is located on the display side of the display panel, and the driver circuit and the display panel are integrated. Therefore, the haptic feedback film layer directly transmits the touch signal to the driver circuit. Or, the driver circuit is disposed separately from the display panel, and the haptic feedback film layer transmits the touch signal to the driver circuit through a universal serial bus (USB).

It may be understood that in the case that the haptic feedback apparatus is a touch display apparatus, when the touch circuit of the touch display apparatus detects a touch operation, a touch position of the touch operation and a pressure value applied to the haptic feedback film layer when the target object touches the haptic feedback film layer are directly determined. The touch circuit transmits the touch position and the pressure value to the driver circuit as a touch signal.

In step 202, a target driving signal corresponding to the touch position is determined.

In the embodiments of the present disclosure, after determining the touch position, the driver circuit determines the target driving signal corresponding to the touch position based on a pre-stored corresponding relationship. The target driving signal includes a plurality of sub-signals with different signal parameters. The target driving signal corresponding to each touch position is determined based on the haptic sensation to be fed back to the target object at the touch position, and the target driving signals corresponding to different touch positions are different.

The signal parameter of each sub-signal includes a frequency of the sub-signal. That is, the target driving signal includes a plurality of sub-signals with different frequencies. Or, the signal parameter of each sub-signal includes a frequency and an amplitude of the sub-signal.

It may be understood that the corresponding relationship is stored in a driver circuit before a haptic feedback apparatus leaves the factory. The corresponding relationship is determined based on the structure, dimensions, and material of the haptic feedback film layer.

As one possible implementation, the haptic feedback film layer is divided into a plurality of different areas, and the driver circuit stores a first corresponding relationship thereon in which a driving signal corresponding to each of the plurality of areas is recorded. The driving signal corresponding to each area is acquired by performing mode decomposition on a desired vibration mode of the area. The desired vibration mode of each area is a haptic sensation to be simulated by the area in the case that the haptic feedback film layer vibrates. For example, the haptic sensation corresponding to the desired vibration mode is that of a switch button, a paper, or a piano key.

It may be understood that in the case that the haptic feedback film layer of the haptic feedback apparatus is prepared, the desired vibration mode corresponding to a haptic sensation is determined based on the haptic sensation required to be simulated in the areas of the haptic feedback film layer. Then, mode decomposition is performed on the desired vibration mode corresponding to each area, so as to acquire a plurality of sub-signals of the desired vibration mode of the area.

In the operation process of the haptic feedback apparatus, after determining the touch position, the driver circuit determines a target area where the touch position is located from a plurality of areas of the haptic feedback film layer, and determines a target driving signal corresponding to the target area according to a first pre-stored corresponding relationship. The driver circuit determines a target driving signal corresponding to the target area by using a look-up-table.

As another possible implementation, the haptic feedback apparatus is a display apparatus, wherein the display apparatus displays a variety of different types of controls. In the example, the driver circuit stores a second corresponding relationship thereon in which a driving signal corresponding to each of a plurality of controls of the display apparatus is recorded. The driving signal corresponding to each control is acquired by performing mode decomposition on a desired vibration mode of the control, and the desired vibration mode of each control is a haptic sensation to be simulated in the case that the control responds to the touch operation.

It may be understood that the display interface of the haptic feedback apparatus displays one or more controls. Different controls will jump to different display interfaces after responding to the touch operation. A developer of the haptic feedback apparatus determines the desired vibration mode of each control based on the display style of the control. The display style of the control includes shape, texture, and/or softness, and the like. After the desired vibration mode of each control is determined, the vibration mode is analyzed to determine a driving signal corresponding to the desired vibration mode, and the corresponding relationship between the control and the driving signal is stored.

In the operation process of the haptic feedback apparatus, after determining the touch position, the driver circuit determines a target control displayed at the touch position. Based on a pre-stored second corresponding relationship between the control and the driving signal, the driver circuit determines a target driving signal corresponding to the target control. The target control belongs to the plurality of controls described above.

Illustratively, after detecting a touch operation on the target control, the haptic feedback apparatus calls a program interface corresponding to the target control to respond to the touch operation. Correspondingly, the driver circuit determines a type of the target control based on the currently called program interface, and further determines the target driving signal corresponding to the target control from the second corresponding relationship.

In some embodiments, in the above two implementations described above, in the case that the number of sub-signals acquired by performing mode decomposition on the desired vibration mode of a certain area (or control) is large, the driver circuit selects a certain number of sub-signals from the plurality of sub-signals as the target driving signal of the area (or control).

The mode decomposition of the vibration mode is described below. The mode refers to a vibration characteristic of a mechanical structure (e.g., a haptic feedback film layer), and each mode has a specific natural frequency, damping ratio, and mode shape. Empirical mode decomposition (EMD) is one of mode decompositions. EMD is a way of decomposing a complex signal containing a plurality of components into a plurality of intrinsic mode functions (IMFs) and a residual component. The residual component may also be referred to as a residual (RS). Each IMF represents the oscillation change of the complex signal in different frequency bands and reflects the local characteristics of the complex signal. The residual component can reflect the slowly changing quantities in the complex signal.

Figure 5:
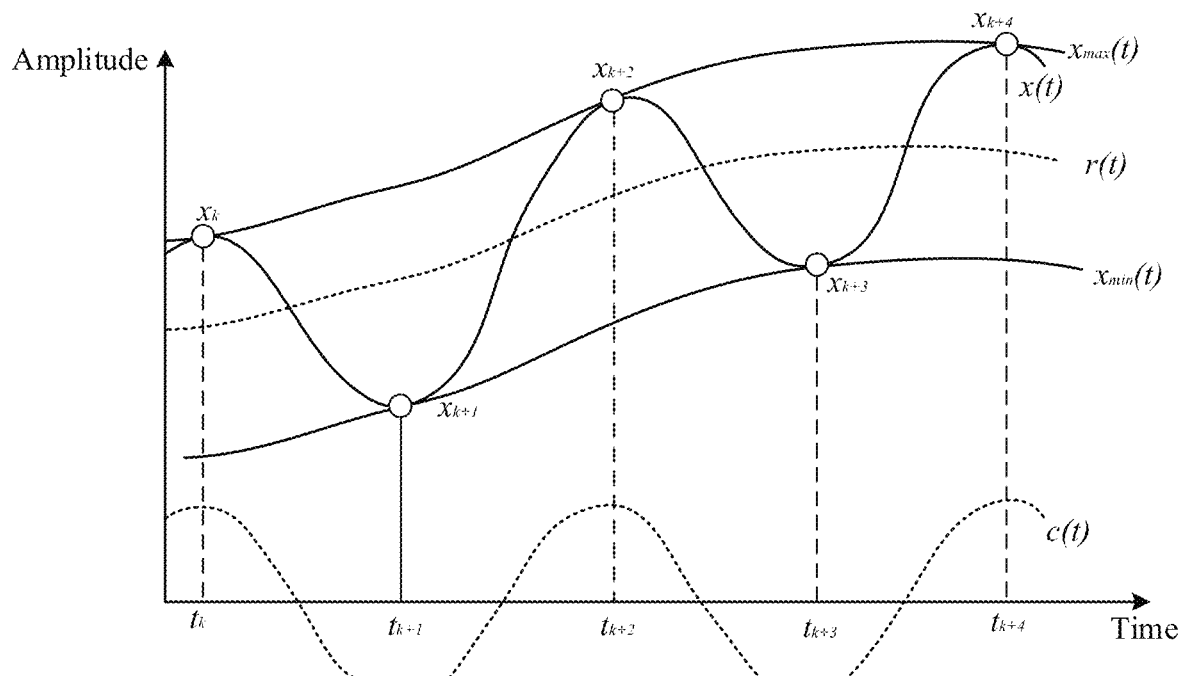
FIG. 5 is a schematic waveform diagram of a driving signal according to some embodiments of the present disclosure.

In the embodiments of the present disclosure, the vibration effect to be achieved by the desired vibration mode needs to be achieved by a plurality of signals with different frequencies, and therefore, after the desired vibration mode is determined, empirical mode decomposition is performed on the vibration mode to determine a signal required to achieve the vibration mode. It is assumed that a signal corresponding to the desired vibration mode is expressed as x(t). The waveform of the signal x(t) is shown in FIG. 5, and the abscissa in FIG. 5 represents time t and the ordinate represents amplitude. The abscissa may also represent different position points on the haptic feedback film layer in the case that the waveform of the signal is input to the haptic feedback film layer. Performing empirical mode decomposition on the signal x(t) includes the following steps.

In S1, all local maximum points and local minimum points of the signal x(t) are connected by curves to form a maximum envelope $t_{max}(t)$ and a minimum envelope $x_{min}(t)$ of x(t). All signals of x(t) are contained between the two envelopes. A mean value curve r(t) of the maximum envelope $x_{max}(t)$ and the minimum envelope $x_{min}(t)$ is calculated. The signal $x_{max}(t)$, the signal $x_{min}(t)$, and the signal r(t) satisfy:

$$r(t) \approx [x_{max}(t) + x_{min}(t)]/2, \ t_l \leq t \leq t_{m^\circ}$$

wherein $t_l$ is the minimum of the independent variable (i.e., time t), $t_m$ is the maximum of the independent variable t, and both l and m are integers greater than or equal to zero. Referring to FIG. 5, $x_k$ and $x_{k+2}$ are two signal values of the maximum envelope $x_{max}(t)$, and $w_{k+1}$ and $x_{k+3}$ are two signal values of the minimum envelope $x_{min}(t)$. Based on the formula, it may be determined that the rate of change of the signal r(t) within the interval $[t_l, t_m]$ satisfies:

$$\frac{1}{2\Delta t}[r(t_m) - r(t_l)] \approx \frac{1}{2}\left(\frac{x_{k+2} - x_k}{t_{k+2} - t_k} + \frac{x_{k+3} - x_{k+1}}{t_{k+3} - t_{k+1}}\right);$$

wherein $x_k$ represents the $k^{th}$ local extreme point of the signal x(t), k is an integer greater than or equal to zero, and $t_k$ is the moment corresponding to the $k^{th}$ extreme point of the signal x(t). $\Delta t$ represents the interval between time $t_l$ and time $t_m$.

In S2, signal c(t) is acquired by taking the difference between signal x(t) and signal r(t). The signal x(t), the signal r(t), and the signal c(t) satisfy:

$$x(t) = c(t) + r(t).$$

Referring to FIG. 5, the vibration waveform of the signal x(t) is a non-standing wave vibration waveform, the vibration waveform of the signal r(t) is a standing wave, and the waveform of the signal c(t) is a traveling wave. The signal x(t) is defined as the addition of two wave functions.

In addition, the following formula is acquired by integrating the signal x(t) within the interval $[t_k, t_{k+2}]$:

$$\int_{t_k}^{t_{k+2}} x(t)dt = \int_{t_k}^{t_{k+2}} c(t)dt + \int_{t_k}^{t_{k+2}} r(t)dt = \int_{t_k}^{t_{k+2}} r(t)dt = r_o(t_{k+2}) - r_o(t_k);$$

wherein $r_0(t)$ is a primitive function of the functional expression of the signal r(t). The functional expressions of the primitive function $r_0(t)$ and the signal r(t) satisfy: $dr_0(t) = r(t)dt \cdot r_0(t_{k+2}) - r_0(t_k)$ is the integral value of the signal r(t) within the interval $[t_k, t_{k+2}]$. It may be understood that during the integration process, since the integral value of the signal c(t) in the interval $[t_k, t_{k+2}]$ is zero, the integral value of the signal x(t) in the interval $[t_k, t_{k+2}]$ is equal to the integral of the signal r(t) in the interval $[t_k, t_{k+2}]$.

In S3, in the case that the signal c(t) satisfies the signal characteristics of the IMF signal, the signal c(t) is taken as a first IMF signal, the signal c(t) is taken as a to-be-processed signal x(t), and the steps S1 and S2 are repeated until a plurality of IMF signals satisfying the IMF signal characteristics are acquired.

In the embodiments of the present disclosure, after a plurality of IMF signals are acquired by performing mode decomposition on the signal x(t), N signals are selected from the plurality of IMF signals as sub-signals of the driving signal, wherein N is an integer greater than one, for example, the value of N is five. The desired vibration mode corresponding to the signal x(t) is acquired by performing mode superposition on the N sub-signals.

Figure 6:
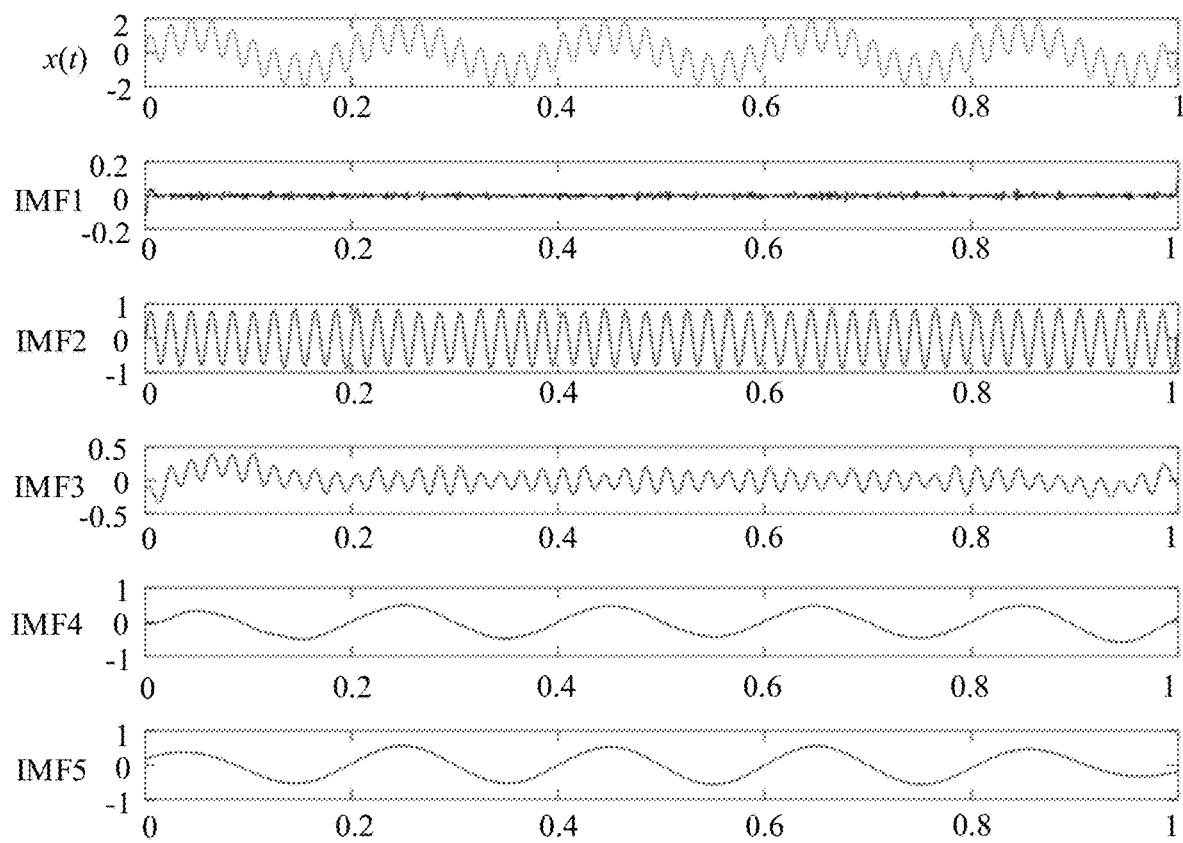
FIG. 6 is a waveform diagram of a plurality of IMF signals acquired by performing mode decomposition on a desired vibration mode according to some embodiments of the present disclosure.

Illustratively, the waveform of the signal x(t) is as shown in FIG. 6, and waveforms corresponding to the signals IMF1 to IMF5 are waveforms of a plurality of sub-signals acquired by performing mode decomposition on the signal x(t). In the waveform diagrams of the plurality of signals shown in FIG. 6, the abscissa represents time, and the ordinate represents amplitude. Referring to FIG. 6, the frequencies of the 5 IMF signals are different from each other.

In step 203, the control circuit sends driving information to the waveform generation circuit.

In the embodiments of the present disclosure, the driver circuit includes a control circuit and a waveform generation circuit. The corresponding relationship between the position and the driving signal is stored in the control circuit. After detecting the touch operation, the haptic feedback film layer transmits the touch signal to the control circuit. After determining a target driving signal corresponding to the touch position based on the first corresponding relationship or the second corresponding relationship, the control circuit sends driving information of the target driving signal to the waveform generation circuit. The driving information includes signal parameters of a plurality of sub-signals included in the target driving signal, driving sequences of the plurality of sub-signals, and driving duration of each sub-signal.

As a first possible example, the driving information includes signal parameters of a plurality of sub-signals included in the target driving signal, driving sequences of the plurality of sub-signals, and driving duration of each sub-signal. The signal parameter of each sub-signal includes a frequency of the sub-signal and a corresponding relationship between an amplitude of the sub-signal and time. It may be understood that the control circuit determines a value range of the independent variable (i.e., time) of each sub-signal included in the target driving signal based on the haptic sensation to be simulated by the desired vibration mode. Based on this, the control circuit determines the driving sequences of the sub-signals and the driving duration of each sub-signal.

Illustratively, in the case that the target driving signal includes the sub-signal SN1, the sub-signal SN2, the sub-signal SN3, the sub-signal SN4, and the sub-signal SN5. It is assumed that the duration of the driving period of the target driving signal is 1 second, and in each driving period, the independent variable of the sub-signal SN1 has a value range of [0, 0.3), the independent variable of the sub-signal SN2 has a value range of [0.3, 0.4), the independent variable of the sub-signal SN3 has a value range of [0.4, 0.5), the independent variable of the sub-signal SN4 has a value range of [0.5, 0.8), and the independent variable of the sub-signal SN5 has a value range of [0.8, 1]. Correspondingly, the driving sequence of the 5 sub-signals is sequentially as follows: the sub-signal SN1, the sub-signal SN2, the sub-signal SN3, the sub-signal SN4, and the sub-signal SN5. The driving duration of the sub-signal SN1 is 0.3 seconds, the driving duration of the sub-signal SN2 is 0.1 seconds, the driving duration of the sub-signal SN3 is 0.1 seconds, the driving duration of the sub-signal SN4 is 0.3 seconds, and the driving duration of the sub-signal SN5 is 0.2 seconds.

As a second possible example, the driving information includes signal parameters of the plurality of sub-signals. The signal parameter of each sub-signal includes a frequency of the sub-signal and an amplitude of the sub-signal.

Referring to FIG. 4, the control circuit (i.e., the master computer Labview) outputs the driving information to the waveform generation circuit after determining the target driving signal corresponding to the touch position based on its internal processing logic.

In step 204a, the waveform generation circuit sequentially outputs a plurality of sub-signals to each actuator according to the driving information.

In the embodiments of the present disclosure, the haptic feedback film layer further includes a plurality of actuators, and the plurality of actuators vibrates under the driving of the signal, so as to drive the haptic feedback film layer to vibrate.

In the first example of the above step 203, the waveform generation circuit includes a waveform generator, and after acquiring the driving information, the waveform generator sequentially outputs the plurality of sub-signals to each actuator according to the driving sequences and the driving duration of the plurality of sub-signals in the driving information.

It may be understood that the waveform generation circuit can drive a plurality of actuators to vibrate simultaneously. That is, for each sub-signal in the target driving signal, the waveform generation circuit can output the sub-signal to the plurality of actuators at the same time.

The plurality of actuators are piezoelectric sheets. That is, the plurality of piezoelectric sheets in the haptic feedback film layer function as actuators of the thin film in the haptic feedback film layer. In addition, the piezoelectric sheets further function as sensors to detect touch operations.

Figure 7:
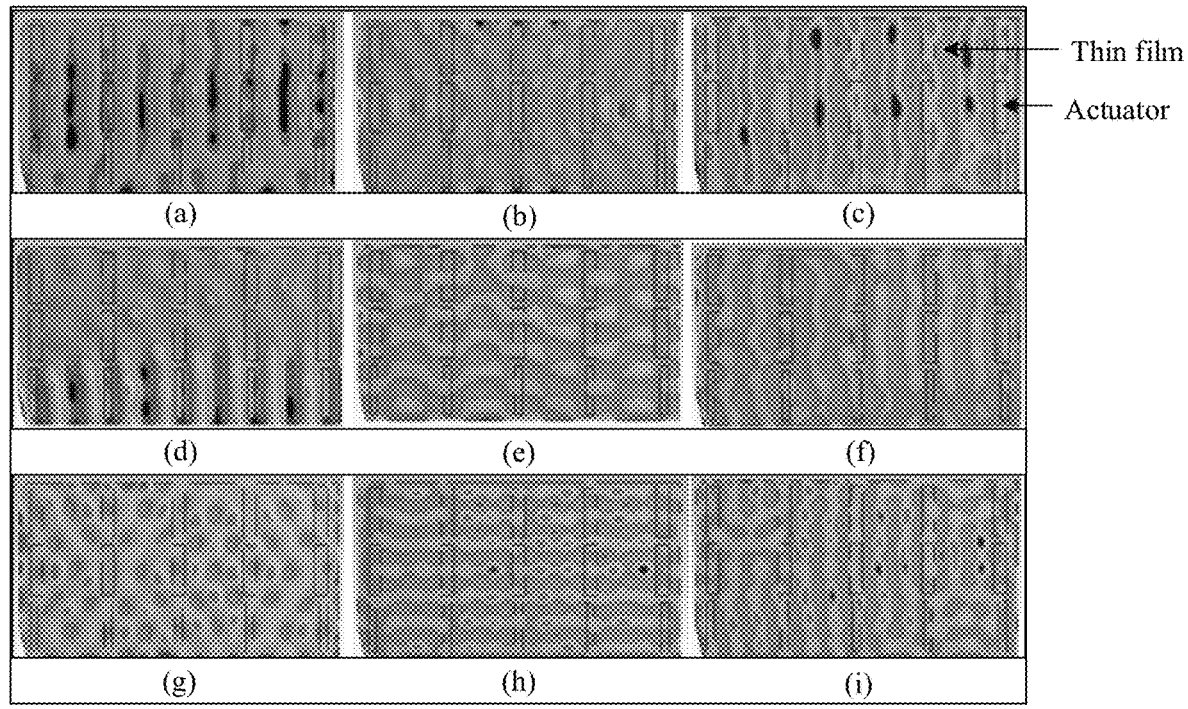
FIG. 7 is a simulation diagram of sub-signals with different signal parameters driving a haptic feedback film layer to vibrate according to some embodiments of the present disclosure.

It may be understood that in the case that each of the plurality of actuators is driven by sub-signals with different signal parameters to drive the thin film to vibrate, the vibration effects generated are different. FIG. 7 is a simulation diagram of vibration effects of the haptic feedback film layer corresponding to 9 sub-signals with different signal parameters. The uniformly arranged rectangles in FIG. 7 are actuators, and the number of actuators in the haptic feedback film layer is 15.

It may further be understood that the thin film of the haptic feedback film layer itself deforms as it vibrates. For example, referring to (f) in FIG. 7, the thin film is deformed longitudinally. Referring to (h) in FIG. 7, the thin film is deformed laterally. In the case that the thin film is deformed, the friction force on the surface thereof is also changed.

Figure 8:
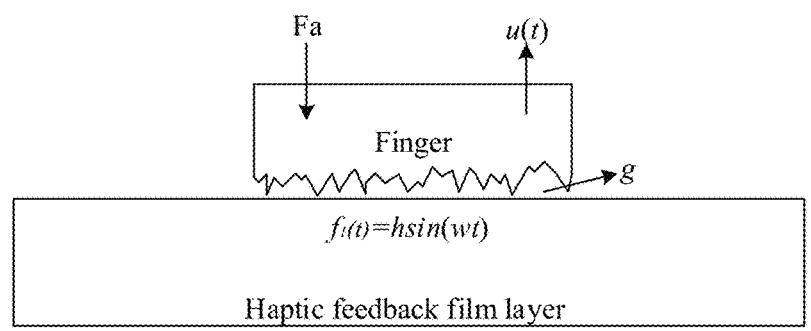
FIG. 8 is a schematic diagram of a haptic sensation fed back to a target object in the case that sub-signals drive a haptic feedback film layer to vibrate according to some embodiments of the present disclosure.

FIG. 8 shows a force that is fed back to a target object (i.e., finger) in the case that the haptic feedback film layer vibrates. As shown in FIG. 8, one sub-signal transmitted to the plurality of actuators of the haptic feedback film layer is $f_1(t)=h \sin(wt)$, wherein h is the amplitude of the sub-signal $f_1(t)$, and w is the angular velocity of the sub-signal $f_1(t)$. It may be understood that in the case that a finger contacts with the haptic feedback film layer, a pressure $F_a$ is applied to the haptic feedback film layer. Since the finger is not perfectly smooth, a gap g is present between the finger and the thin film of the haptic feedback film layer. In the case that the haptic feedback film layer vibrates under the driving of the sub-signal $f_1(t)$, the thin film of the haptic feedback film layer is deformed, and meanwhile, a reverse force is applied to the finger. The reverse force causes the finger to jump slightly. The rate u(t) of finger jumping is positively correlated with the frequency of the sub-signal. In the case that the force is fed back to the finger, the finger feels the effect of touching a real object (e.g., a key).

It may be understood that compared with a method for driving a haptic feedback film layer to vibrate by a signal with a fixed frequency, the haptic feedback method according to embodiments of the present disclosure sequentially outputs a plurality of sub-signals with different signal parameters to the haptic feedback film layer, and therefore, in the case that the haptic feedback film layer vibrates, not only a standing wave but also other types of waves are formed on a surface of the thin film, and a vibration effect formed by the haptic feedback film layer is effectively improved.

In 204b, the waveform generation circuit simultaneously outputs a plurality of sub-signals to each actuator according to the driving information.

In the second example of the above step 203, the waveform generation circuit includes a plurality of waveform generators. After acquiring the driving information, each of the plurality of waveform generators outputs a sub-signal to each of the actuators. Thereby, the plurality of waveform generators can simultaneously output a plurality of sub-signals to each actuator. The signal parameters of the sub-signals outputted by each waveform generator are different from each other.

It may be understood that in the example, the plurality of sub-signals are simultaneously transmitted to the plurality of actuators, and drive the plurality of actuators to vibrate at the same time.

Figure 9:
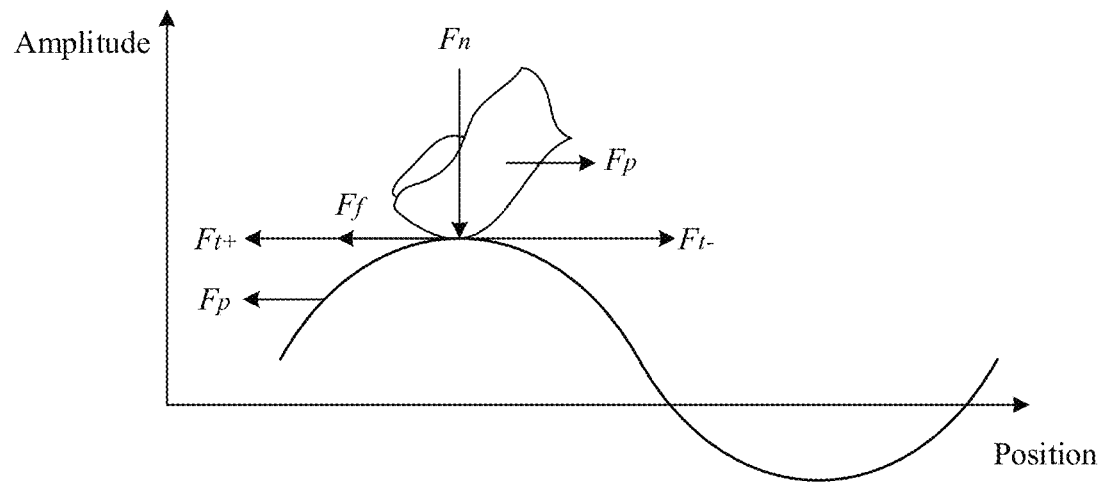
FIG. 9 is a force diagram of a target object touching a haptic feedback film layer according to some embodiments of the present disclosure.

FIG. 9 shows a force diagram of a finger touching a haptic feedback film layer. $F_n$ is a normal force between a finger and the haptic feedback film layer that is touched by the finger, $F_p$ is a force applied to the finger in the touch sliding direction, and $F_f$ is a reaction force (i.e., friction force) applied to the finger on the haptic feedback film layer. $F_t$ is a tangential force between the finger and the haptic feedback film layer that is touched by the finger, $+F_t$ represents a tangential force in the same direction as the friction force $F_f$, and $-F_t$ represents a tangential force in the opposite direction to the friction force $F_f$. The size of $F_t$ is related to the lateral motion trajectory of the mass points of the haptic feedback film layer.

It may be understood that the forces applied to the finger at different moments are different since the driving signal includes a plurality of sub-signals with mutually different signal parameters. Therefore, the driving signal formed by superposing the plurality of sub-signals can cause the friction force generated on the haptic feedback film layer to be more complex, and further cause the haptic effect achieved by the haptic feedback film layer to be richer.

In summary, some embodiments of the present disclosure provide a haptic feedback method. After determining the touch position corresponding to the touch operation, the driver circuit determines a target driving signal corresponding to the touch position, and drives the haptic feedback film layer to vibrate through the target driving signal. Since the target driving signal includes a plurality of sub-signals with different signal parameters, rich vibration effects are achieved in the haptic feedback film layer; and since the target driving signal is determined based on the touch position, the haptic feedback film layer provides different vibration effects for different touch positions, thereby effectively improving the flexibility of haptic feedback.

Figure 10:
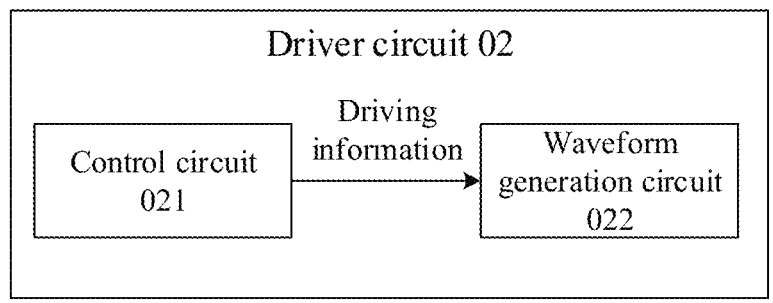
FIG. 10 is a schematic structural diagram of a driver circuit of a haptic feedback film layer according to some embodiments of the present disclosure.

FIG. 10 is a schematic structural diagram of a driver circuit of a haptic feedback film layer according to some embodiments of the present disclosure, which is applicable to a haptic feedback apparatus. Referring to FIG. 10, the driver circuit includes a control circuit 021 and a waveform generation circuit 022. The waveform generation circuit 022 is connected to the haptic feedback film layer 01.

The control circuit 021 is configured to determine a touch position corresponding to a touch operation received by the haptic feedback film layer 01, and determine a target driving signal corresponding to the touch position, wherein the target driving signal includes a plurality of sub-signals with different signal parameters.

The waveform generation circuit 022 is configured to output the target driving signal so as to drive the haptic feedback film layer 01 to vibrate.

In some embodiments, the haptic feedback film layer 01 is provided with a plurality of areas, the control circuit 021 stores a first corresponding relationship thereon in which a driving signal corresponding to each of the plurality of areas is recorded, and the control circuit 021 is configured to:
determine a target area where the touch position is located from the plurality of areas; and
determine the target driving signal corresponding to the target area according to the first corresponding relationship.

In some embodiments, the driving signal corresponding to each area in the first corresponding relationship is acquired by performing mode decomposition on a desired vibration mode of the area.

In some embodiments, the haptic feedback apparatus is a display apparatus, the control circuit 021 stores a second corresponding relationship thereon in which a driving signal corresponding to each of the plurality of controls is recorded, and the control circuit 021 is configured to:
determine a target control displayed at the touch position, wherein the target control belongs to the plurality of controls; and
determine a target driving signal corresponding to the target control according to the second corresponding relationship.

In some embodiments, the driving signal corresponding to each control in the second corresponding relationship is acquired by performing mode decomposition on a desired vibration mode of the control.

In some embodiments, the control circuit 021 is configured to determine a target driving signal corresponding to the touch position in the case that a pressure value of a target object touching the haptic feedback film layer is determined to be greater than a pressure threshold.

In some embodiments, the haptic feedback film layer 01 includes a plurality of actuators located at different areas, and the control circuit 021 is configured to control the waveform generation circuit 022 to output the plurality of sub-signals to each of the plurality of actuators.

In some embodiments, the control circuit 021 is configured to send driving information to the waveform generation circuit 022, wherein the driving information includes signal parameters of the plurality of sub-signals, driving sequences of the plurality of sub-signals, and driving duration of each sub-signal.

The waveform generation circuit 022 is configured to sequentially output the plurality of sub-signals to each actuator according to the driving information.

In summary, some embodiments of the present disclosure provide a driver circuit of a haptic feedback film layer. After determining the touch position corresponding to the touch operation, the driver circuit determines a target driving signal corresponding to the touch position, and drives the haptic feedback film layer to vibrate through the target driving signal. Since the target driving signal includes a plurality of sub-signals with different signal parameters, rich vibration effects are achieved in the haptic feedback film layer; and since the target driving signal is determined based on the touch position, the haptic feedback film layer provides different vibration effects for different touch positions, thereby effectively improving the flexibility of haptic feedback.

It may be understood that the driver circuit of the haptic feedback film layer and the haptic feedback method according to the above embodiments belong to the same concept, and specific implementation processes thereof are described in the method embodiments in detail and are not repeated herein.

Figure 11:
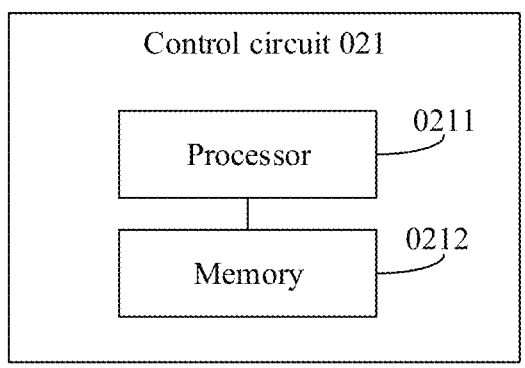
FIG. 11 is a schematic structural diagram of a control circuit according to some embodiments of the present disclosure.

Some embodiments of the present disclosure further provide a control circuit. As shown in FIG. 11, the control circuit 021 includes a processor 0211 and a memory 0212. The memory 0212 stores instructions thereon. The instructions, when loaded and executed by the processor 0211, cause the control circuit to perform the haptic feedback method according to the above method embodiment. For example, the steps performed by the control circuit in the haptic feedback method described above are implemented.

Some embodiments of the present disclosure further provide a non-transitory computer-readable storage medium storing instructions thereon. The instructions, when loaded and executed by a processor of an electronic device, cause the electronic device to perform the haptic feedback method according to the above method embodiment. For example, the steps performed by the control circuit in the haptic feedback method described above are implemented.

Some embodiments of the present disclosure further provide a computer program product or a computer program including computer instructions. The computer instructions, when loaded and executed by a processor of an electronic device, cause the electronic device to perform the haptic feedback method according to the above aspect. For example, the steps performed by the control circuit in the haptic feedback method described above are implemented.

It may be understood that the term "plurality" in the present disclosure means two or more. In the present disclosure, the terms "first", "second", and the like are defined to distinguish the same or similar items with substantially identical functions and functionalities, and it should be understood that "first", "second", and "$n^{th}$" have no logical or sequential dependency relationship, and no limitation on the number or execution sequence.

The mentioned "and/or" herein indicates that three relationships may be present. For example, A and/or B may indicate that: only A is present, both A and B are present, and only B is present. The symbol "/" generally indicates an "or" relationship between the associated objects.

It will be appreciated by those of ordinary skill in the art that all or a part of the steps for implementing the above embodiments may be completed by hardware, or may be completed by instructing relevant hardware by a program stored in a computer-readable storage medium. The storage medium mentioned above may be a read-only memory, a magnetic disk, an optical disk, or the like.

Described above are merely exemplary embodiments of the present disclosure and are not intended to limit the present disclosure. Any modifications, equivalents, improvements, and the like, made within the spirit and principle of the present disclosure should fall within the protection scope of the present disclosure.

What is claimed is:

1. A haptic feedback method, applicable to a driver circuit in a haptic feedback apparatus comprising a haptic feedback film layer, wherein the haptic feedback film layer comprises a plurality of actuators located at different areas, and the driver circuit comprises: a control circuit and a waveform generation circuit, the method comprises:
    determining a touch position corresponding to a touch operation received by the haptic feedback film layer;
    determining a target driving signal corresponding to the touch position, wherein the target driving signal comprises a plurality of sub-signals with different signal parameters; and
    driving the haptic feedback film layer to vibrate through the target driving signal;
    wherein driving the haptic feedback film layer to vibrate through the target driving signal comprises:
    sending, by the control circuit, driving information to the waveform generation circuit, wherein the driving information comprises signal parameters of the plurality of sub-signals, driving sequences of the plurality of sub-signals, and driving duration of each sub-signal of the plurality of sub-signals; and
    sequentially or simultaneously outputting, by the waveform generation circuit, the plurality of sub-signals to each actuator of the plurality of actuators according to the driving information.

2. The haptic feedback method according to claim 1, wherein the haptic feedback film layer is provided with a plurality of areas, and the driver circuit stores a first corresponding relationship thereon in which a driving signal corresponding to each of the plurality of areas is recorded; and determining the target driving signal corresponding to the touch position comprises:
    determining a target area where the touch position is located from the plurality of areas; and
    determining a target driving signal corresponding to the target area according to the first corresponding relationship.

3. The haptic feedback method according to claim 2, wherein the driving signal corresponding to each area of the plurality of areas in the first corresponding relationship is acquired by performing mode decomposition on a desired vibration mode of the target area.

4. The haptic feedback method according to claim 2, wherein the haptic feedback apparatus is a display apparatus, the driver circuit stores a second corresponding relationship thereon in which a driving signal corresponding to each of a plurality of controls is recorded, and determining the target driving signal corresponding to the touch position comprises:
    determining a target control displayed at the touch position, wherein the target control belongs to the plurality of controls; and
    determining a target driving signal corresponding to the target control according to the second corresponding relationship.

5. The haptic feedback method according to claim 4, wherein the driving signal corresponding to each control in the second corresponding relationship is acquired by performing mode decomposition on a desired vibration mode of the target control.

6. The haptic feedback method according to claim 1, wherein determining the target driving signal corresponding to the touch position comprises:
    in a case that a pressure value of a target object touching the haptic feedback film layer is determined to be greater than a pressure threshold, determining the target driving signal corresponding to the touch position.

7. The haptic feedback method according to claim 1, wherein a signal parameter of each of the plurality of sub-signals comprises a frequency.

8. A driver circuit of a haptic feedback film layer, applicable to a haptic feedback apparatus, wherein the driver circuit comprises: a control circuit and a waveform generation circuit, and the haptic feedback film layer comprises a plurality of actuators located at different areas, wherein the waveform generation circuit is connected with the haptic feedback film layer;
    the control circuit is configured to determine a touch position corresponding to a touch operation received by the haptic feedback film layer, and determine a target driving signal corresponding to the touch position, wherein the target driving signal comprises a plurality of sub-signals with different signal parameters;
    the waveform generation circuit is configured to output the target driving signal so as to drive the haptic feedback film layer to vibrate;

the control circuit is configured to send driving information to the waveform generation circuit, the driving information comprising signal parameters of the plurality of sub-signals, driving sequences of the plurality of sub-signals, and driving duration of each sub-signal of the plurality of sub-signals; and the waveform generation circuit is configured to sequentially or simultaneously output the plurality of sub-signals to each actuator of the plurality of actuators according to the driving information.

9. The driver circuit according to claim 8, wherein the haptic feedback film layer is provided with a plurality of areas, the control circuit stores a first corresponding relationship thereon in which a driving signal corresponding to each of the plurality of areas is recorded, and the control circuit is configured to:

determine a target area where the touch position is located from the plurality of areas; and determine a target driving signal corresponding to the target area according to the first corresponding relationship.

10. The driver circuit according to claim 9, wherein the haptic feedback apparatus is a display apparatus, the control circuit stores a second corresponding relationship thereon in which a driving signal corresponding to each of a plurality of controls is recorded, and the control circuit is configured to:

determine a target control displayed at the touch position, wherein the target control belongs to the plurality of controls; and determine a target driving signal corresponding to the target control according to the second corresponding relationship.

11. The driver circuit according to claim 8, wherein the control circuit is configured to determine the target driving signal corresponding to the touch position in a case that a pressure value of a target object touching the haptic feedback film layer is determined to be greater than a pressure threshold.

12. A haptic feedback apparatus comprising a haptic feedback film layer and a driver circuit, wherein the driver circuit comprises a control circuit and a waveform generation circuit, and the haptic feedback film layer comprises a plurality of actuators located at different areas, wherein the waveform generation circuit is connected with the haptic feedback film layer;

the control circuit is configured to determine a touch position corresponding to a touch operation received by the haptic feedback film layer, and determine a target driving signal corresponding to the touch position, wherein the target driving signal comprises a plurality of sub-signals with different signal parameters;

the waveform generation circuit is configured to output the target driving signal so as to drive the haptic feedback film layer to vibrate;

the control circuit is configured to send driving information to the waveform generation circuit, the driving information comprising signal parameters of the plurality of sub-signals, driving sequences of the plurality of sub-signals, and driving duration of each sub-signal of the plurality of sub-signals; and the waveform generation circuit is configured to sequentially or simultaneously output the plurality of sub-signals to each actuator of the plurality of actuators according to the driving information.

13. The haptic feedback apparatus according to claim 12, wherein the haptic feedback film layer is provided with a plurality of areas, the control circuit stores a first corresponding relationship thereon in which a driving signal corresponding to each of the plurality of areas is recorded, and the control circuit is configured to:

determine a target area where the touch position is located from the plurality of areas; and determine a target driving signal corresponding to the target area according to the first corresponding relationship.

14. The haptic feedback apparatus according to claim 13, wherein the haptic feedback apparatus is a display apparatus, the control circuit stores a second corresponding relationship thereon in which a driving signal corresponding to each of a plurality of controls is recorded, and the control circuit is configured to:

determine a target control displayed at the touch position, wherein the target control belongs to the plurality of controls; and determine a target driving signal corresponding to the target control according to the second corresponding relationship.

* * * * *